United States Patent Office 3,729,350
Patented Apr. 24, 1973

3,729,350
COMPOSITION FOR FORMING CLOUD OF IN-
CAPACITATING AGENT UPON DETONATION
William A. Gey, China Lake, Calif., assignor to the
United States of America as represented by the Secretary of the Navy
No Drawing. Filed Feb. 2, 1970, Ser. No. 12,880
Int. Cl. C06b 17/00
U.S. Cl. 149—21         4 Claims

ABSTRACT OF THE DISCLOSURE

A formulation in pellet form which upon detonation forms an instantaneous cloud of an incapacitating agent which comprises a blend of ortho-chlorobenzamalonitrile and a high explosive.

GOVERNMENT INTEREST

The invention described herein may be manufactured and used by or for the Government of the United States of America for governmental purposes without the payment of any royalties thereon or therefor.

BACKGROUND OF THE INVENTION

This invention relates to a formulation which upon detonation forms an instantaneous cloud of an incapacitating agent.

Notably among the various instruments known or employed for carrying incapacitating agents or gases to a substantially remote point in relation to the supply are projectiles such as bullets so equipped that upon impact the cartridge or shell explodes thus releasing the contents. The contents often burn upon impact thereby destroying the effectiveness of the material. The present invention is for an incapacitating formulation which upon detonation instantaneously forms an aerosol cloud of minute particles of the disabling agent. This invention is useful in controlling riots, curbing uprisings and assisting in other antipersonnel conditions.

BRIEF DESCRIPTION OF THE INVENTION

In accordance with the invention from about 25 to 50 percent of a high explosive selected from the group consisting of cyclotrimethylenetrinitramine (RDX), cyclotetramethylenetetranitramine (HMX) and triaminoguanidium, 5-nitroaminotetrazole (TAGNAT) and from about 50 to 75 percent of the tear gas, ortho-chlorobenzamalonitrile (CS) were blended together and pressed into pellets or billets. Upon detonation a cloud of the tear gas formed instantaneously.

The following examples are given to better illustrate the invention but should not be considered as limiting it.

Example I

Ingredients:                                      Percent by wt.
Ortho-chlorobenzamalonitrile (CS) _____ 50
Triaminoguanidinium, 5-nitroaminotetrazole
  (TAGNAT) _____ 50

The ingredients were blended together until a homogeneous mixture resulted which was pressed into a number of pellets which were detonated. Aerosol clouds of particles of ortho-chlorobenzamalonitrile of about $8\mu$ in size resulted with about 80% recovery of the ortho-chlorobenzamalonitrile material in the pellet.

Example II

Ingredients:                                      Percent by wt.
Cyclotetramethylenetetranitramine (HMX) ___ 25
Ortho-chlorobenzamalonitrile (CS) _____ 75

The HMX of a particle size of about $5\mu$ and the ortho-chlorobenzamalonitrile were blended and pressed into pellets of varying size. Several pellets were detonated and recovery of about 70% of the particles of ortho-chlorobenzamalonitrile of about $8\mu$ was made.

Example III

Ingredients:                                      Percent by wt.
Cyclotrimethylenetrinitramine (RDX) (fine particles from 5 to $10\mu$) _____ 30
Ortho-chlorobenzamalonitrile (CS) _____ 70

7.5 grams of RDX and 22.5 grams of ortho-chlorobenzamalonitrile were blended together with a small amount (3%) of Cab-O-Sil to prevent caking. (Cab-O-Sil is a trademark for colloidal pyrogenic silica pigment.) Pellets were pressed at 20,000 p.s.i. to achieve a pellet density of 1.4 g./cc. Several detonation tests were made of these pellets and the average recovery of ortho-chlorobenzamalonitrile particles was 72% from the aerosol clouds formed.

These formulations produce an aerosol agent of fine particles, which causes tears to form creating a temporary inability to perform effectively. Other high explosives such as diaminotrinitrobenzene (DATB) may be used. The particle size of the explosive used with the ortho-chlorobenzamalonitrile is critical to the successful instantaneous cloud formation. Fine mesh particles ranging in size from $5\mu$ to $10\mu$ are necessary. Coarser particles of explosive have been mixed with the tear gas material but the mixture failed to detonate and form the aerosol cloud.

What is claimed is:
1. A formulation which upon detonation forms an instantaneous cloud of an incapacitating agent which comprises
   a blend of from 50 to 75 percent by weight ortho-chlorobenzamalonitrile; and
   from 25 to 50 percent by weight of a fine mesh explosive selected from the group consisting of cyclotrimethylenetrinitramine, cyclotetramethylenetetranitramine, triaminoguanidinium, 5-nitroaminotetrazole and mixtures thereof.
2. The formulation of claim 1 wherein particle size of the cyclotrimethylenetrinitramine ranges from 5 to $10\mu$.
3. The formulation of claim 1 wherein the particle size of cyclotetramethylenetetranitramine is about $5\mu$.
4. The formulation of claim 1 additionally containing a colloidal pyrogenic silica pigment.

References Cited
UNITED STATES PATENTS
3,042,580    7/1962    Jacobi et al. _____ 149—92
3,314,835    4/1967    White et al. _____ 149—92 X STEPHEN J. LECHERT, Jr, Primary Examiner U.S. Cl. X.R.
149—88, 92, 111; 424—304